United States Patent
Baum et al.

(10) Patent No.: US 10,640,523 B2
(45) Date of Patent: May 5, 2020

(54) AMINOIODOSILANES AND METHODS OF SYNTHESIZING THESE AMINOIODOSILANES

(71) Applicant: ENTEGRIS, INC., Billerica, MA (US)

(72) Inventors: Thomas H. Baum, New Fairfield, CT (US); Manish Khandelwal, Danbury, CT (US); David Kuiper, Brookfield, CT (US)

(73) Assignee: ENTEGRIS, INC., Billerica, MA (US)

( * ) Notice: Subject to any disclaimer, the term of this patent is extended or adjusted under 35 U.S.C. 154(b) by 9 days.

(21) Appl. No.: 16/242,706

(22) Filed: Jan. 8, 2019

(65) Prior Publication Data

US 2019/0218238 A1    Jul. 18, 2019

Related U.S. Application Data

(60) Provisional application No. 62/616,568, filed on Jan. 12, 2018.

(51) Int. Cl.
    *C07F 7/10* (2006.01)
    *C07F 13/00* (2006.01)
    *B01D 3/10* (2006.01)

(52) U.S. Cl.
    CPC .............. *C07F 13/005* (2013.01); *C07F 7/10* (2013.01); *B01D 3/10* (2013.01)

(58) Field of Classification Search
    None
    See application file for complete search history.

(56) References Cited

U.S. PATENT DOCUMENTS

| | | | |
|---|---|---|---|
| 9,701,695 B1 * | 7/2017 | Kuchenbeiser | ......... C07F 7/025 |
| 2013/0078392 A1 | 3/2013 | Xiao et al. | |
| 2014/0273477 A1 | 9/2014 | Niskanen et al. | |
| 2014/0273531 A1 | 9/2014 | Niskanen et al. | |
| 2016/0115593 A1 | 4/2016 | Kuchenbeiser et al. | |

FOREIGN PATENT DOCUMENTS

| | | |
|---|---|---|
| WO | 2006/044019 | 4/2006 |
| WO | 2011/123792 | 10/2011 |

OTHER PUBLICATIONS

Hagan, A.P. et al., "Reaction of Silicon Tetrahalides with Methyl Amines", Journal of Inorganic and Nuclear Chemistry, 1972 vol. 34, No. 2, pp. 487-490.

Cass, R. et, al., "Dimethylaminochlorosilanes", Journal of the Chemical Society, pp. 2347-2349, 1952 (Abstract Only).

* cited by examiner

*Primary Examiner* — Clinton A Brooks
*Assistant Examiner* — Kofi Adzamli
(74) *Attorney, Agent, or Firm* — Entegris, Inc.

(57) ABSTRACT

Methods of synthesizing aminoiodosilanes are disclosed. The reaction to produce the disclosed aminoiodosilanes is represented by the formula:

$$SiI_4 + z(NH_2R^1) = SiI_y(NHR^1)_z,$$

wherein $R^1$ is selected from a $C_1$-$C_{10}$ alkyl or cycloalkyl, aryl, or a hetero group; y=1 to 3; and z=4−y.

12 Claims, 3 Drawing Sheets

AMINOIODOSILANES AND METHODS OF SYNTHESIZING THESE AMINOIODOSILANES

CROSS-REFERENCE TO RELATED APPLICATIONS

This application claims the benefit under 35 USC 119 of U.S. Provisional Patent Application No. 62/616,568, filed Jan. 12, 2018, the disclosure of which is hereby incorporated herein by reference in its entirety for all purposes.

FIELD OF THE INVENTION

The present application relates to aminoiodosilanes and to methods for preparing aminoiodisilanes.

BACKGROUND

Aminohalosilanes are commercially important because of their chemical properties and potential use as film deposition precursors across a wide range of industries. The deposited films may be used, for example, as semiconductor dielectric materials and coatings, photovoltaic device coatings, refractory optical coatings and aerospace materials.

Synthesis of amino(halo)silanes has been achieved via aminolysis of halosilanes (J. Chem. Soc. 1952, pp. 2347-2349). This known synthetic method also produces ammonium halide salt byproducts.

A need remains for synthesis methods to produce iodo-aminosilicon precursors that may be suitable, for example, for use in film deposition processes.

SUMMARY

Methods of synthesizing aminoiodosilanes are disclosed. The reaction to produce the disclosed aminoiodosilanes is represented by the equation:

$SiI_4 + z(NH_2R^1) = SiI_y(NHR^1)_z$, wherein $R^1$ is selected from a $C_1$-$C_{10}$ alkyl or cycloalkyl, aryl, or a hetero group; y=1 to 3; and z=4−y.

The disclosed methods comprise reacting an iodosilane having the formula, $SiI_4$, with a monosubstituted amine having the formula, $NH_2R^1$, to produce an aminoiodosilane reaction product having the formula, $SiI_y(NHR^1)_z$, wherein $R^1$ is selected from $C_1$-$C_{10}$ alkyl or cycloalkyl, aryl, or a hetero group; y=1 to 3; and z=4−y.

BRIEF DESCRIPTION OF THE DRAWINGS

For a further understanding of the nature and objects of the present invention, reference should be made to the following detailed description, taken in conjunction with the accompanying figures.

DESCRIPTION

Figure 1:
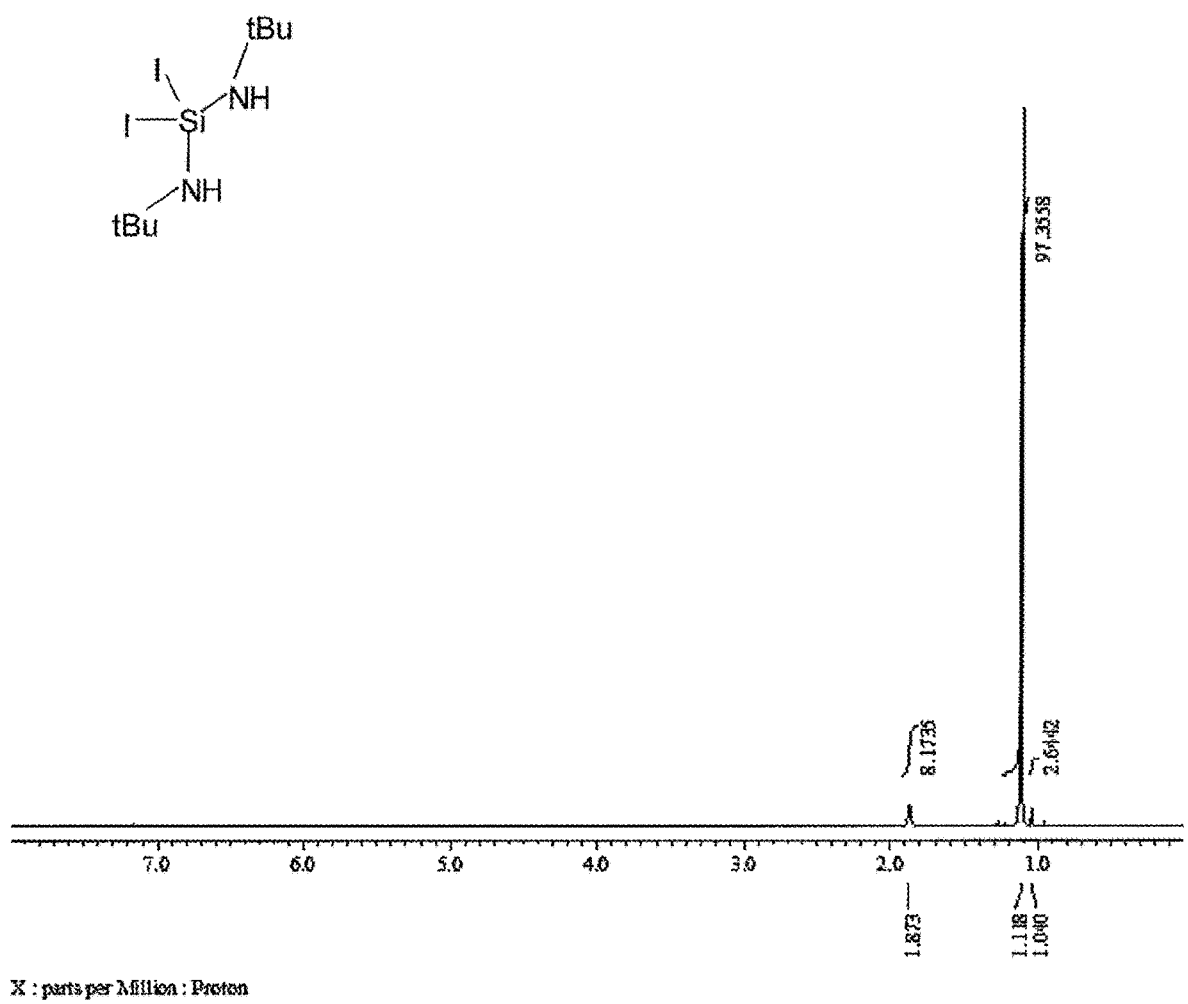
FIG. 1 is an illustration of a proton NMR spectrum of bis(t-butylamino(diiodo)-silane produced by a method described in this disclosure.

The following detailed description and claims may utilize a number of abbreviations, symbols, and terms, which are generally well known in the art. While definitions are typically provided with the first instance of each acronym, for convenience, Table 1 provides a list of the abbreviations, symbols, and terms used along with their respective definitions.

TABLE 1

| Term | Description |
| --- | --- |
| a or an | one or more than one |
| approximately or about | ±10% of the value stated |
| CVD | chemical vapor deposition |
| ALD | atomic layer deposition |
| sccm | standard cubic centimeters per minute |
| MP | melting point |
| TGA | thermogravimetric analysis |
| GCMS | gas chromatography mass spectrometry |
| alkyl or cycloalkyl | saturated functional groups containing exclusively carbon and hydrogen atoms, including linear, branched, or cyclic alkyl groups |
| aryl | aromatic ring compounds where one hydrogen atom has been removed from the ring |
| hetero | a functional group containing carbon and a second non-H element, such as S, N or O |
| heterocycle | cyclic compounds that contains atoms of at least two different elements as members of the ring structure |
| Me | Methyl |
| Et | Ethyl |
| Pr | propyl, including iPr and nPr |
| iPr | iso-propyl |
| nPr | n-propyl |
| Bu | butyl, including iBu, sBu, and tBu |
| iBu | iso-butyl |
| sBu | sec-butyl |
| tBu | tert-butyl |

The standard abbreviations of the elements from the periodic table of elements are used and elements may be referred to by conventional abbreviations (e.g., Si refers to silicon, N refers to nitrogen, O refers to oxygen, C refers to carbon, etc.).

All ranges include their end-points, for example, x=1 to 4 includes x=1, x=4 and x=any number in between.

The disclosed methods comprise reacting an iodosilane having the formula, $SiI_4$, with a monosubstituted amine having the formula, $NH_2R^1$, to produce an aminoiodosilane reaction product having the formula, $SiI_y(NHR^1)_z$, wherein $R^1$ selected from $C_1$-$C_{10}$ alkyl or cycloalkyl, aryl, or a hetero group; y=1 to 3; and z=4−y.

According to an embodiment of the present disclosure, an iodosilane is added under an inert atmosphere to a reactor or reaction flask at a temperature ranging from approximately −100° C. to approximately 20° C., preferably ranging from approximately −78° C. to approximately 15° C., more preferably ranging from approximately −40° C. to approximately 0° C., or more preferably from approximately −15° C. to approximately −5° C. In various embodiments, the inert atmosphere utilized may include Ar, $N_2$, He, or Kr.

The monosubstituted amine is then added to the reaction flask to produce a mixture of the iodosilane and the monosubstituted amine at a temperature ranging, for example, from approximately −15° C. to approximately −5° C. The monosubstituted amine may be pre-chilled or pre-heated to the temperature equal to the temperature of the iodosilane in the flask.

The molar ratio of iodosilane to monosubstituted amine may range from approximately 1:2 for monosubstituted products and from approximately 1:4 for disubstituted products. The molar ratio may be adjusted or varied as needed to optimize the formation of the desired product and/or to simplify the purification of the desired reaction product.

The reaction may be performed solvent free or may employ a solvent, which may include but is not limited to pentane, hexane, heptane, diethyl ether, dibutyl ether, toluene, tetrahydrofuran (THF), 2-methyltetrahydrofuran, diglyme, dichloromethane, chloroform, anisole, benzene, or acetonitrile. When one or both of the reactants and the aminoiodosilane reaction product are all liquids or low melting point solids (i.e. 23-50° C.), the process may be performed without a solvent, which may shorten the synthesis process and may also reduce the concentration of impurities in the reaction product.

The reaction product mixture is subsequently allowed to warm to room temperature and may be stirred for approximately 1-48 hours at room temperature. The stirred reaction product mixture may be a cloudy liquid comprising aminoiodosilane, unreacted iodosilane, alkylammonium iodide salts and possible impurities.

When the aminohalosilane reaction product is a solid, the stirred mixture may be filtered to remove impurities and obtain the aminoiodosilane reaction product. The product may be extracted using a solvent, such as pentane, hexanes and toluene. Typical filters include glass or polymer fritted filters.

The aminoiodosilane reaction product may then be isolated and/or purified using, for example, distillation or vacuum distillation at a temperature range above room temperature, preferably at a range from 25° C. to 150° C., more preferably at a range from 30° C. to 120° C., even more preferably at a range from 50° C. to 70° C. at pressures ranging from about 50 mTorr to 1 Torr.

Alternatively, when the aminoiodosilane reaction product is a liquid, the stirred mixture may be filtered to remove solid byproducts. A filtration agent such as anhydrous diatomaceous earth may be employed to improve the process. Typical filters include glass or polymer frit filters. This step may be sufficient to remove all the solid byproducts.

In another embodiment, the filtrate may need further processing. For example, when the filtrate yields a heterogeneous suspension of solid material, the filtrate may then be distilled over a short path column to yield the aminoiodosilane reaction product through a flash distillation process that removes some or all of the non-desired reaction products or impurities. Alternatively, the aminoiodosilane reaction product may be isolated from the filtrate through, for example, a vacuum distillation column or by heating the filtrate to approximately the boiling point of the aminoiodosilane. In another alternative, both the flash process and the distillation column may be necessary. One of ordinary skill in the art will recognize that the boiling point of the warmed stirred mixture will change as the aminoiodosilane reaction product is isolated from the warmed stirred mixture and adjust the recovery temperature accordingly. Any unreacted iodosilane may be recovered and one of ordinary skill in the art will recognize that the iodosilane may be recovered for later use or disposal.

As shown in the examples below, the purified product may be analyzed by gas chromatography and/or mass spectrometry (GCMS) which shows its purity. The structure of the product may be confirmed by $^1$H, $^{13}$C and/or $^{29}$Si NMR.

In the disclosed methods, solvents may be selected from arenes, alkanes, alkenes, cycloalkanes or alkyne-based compounds. The selected solvent is not reactive with any of the reactants or products. Furthermore, the solvent must be a liquid at the reaction temperature. Therefore, the selected solvent remains a liquid at temperatures ranging between −100° C. and the boiling point of the solvent. Finally, the solvent must be dry in order to prevent the formation of oxygenated species, such as disiloxanes. Exemplary solvents include hexane, toluene, heptane, ethylbenzene, or one or more of the xylenes. The xylenes are 1,2-dimethylbenzene, 1,3-dimethylbenzene, and 1-4-dimethylbenzene. Preferably, the solvents are hexane or toluene because they do not freeze at −78° C. Other solvents having properties similar to hexane and toluene are also preferable in the disclosed methods.

The following is a list of exemplary aminohalosilane reaction products produced by the disclosed synthesis methods.

Exemplary aminoiodoilanes may have the formula $SiI_3(NHR^1)$, wherein $R^1$ is selected from $C_1$-$C_{10}$ alkyl, aryl, or hetero group. In some embodiments $R^1$ may be methyl, ethyl, n-propyl, iso-propyl, n-butyl, iso-butyl, sec-butyl, tert-butyl, cyclopentyl or cyclohexyl. Exemplary compounds include, $SiI_3NHCH_3$, $SiI_3NHCH_2CH_3$ and $SiI_3NHCH(CH_3)_2$.

Exemplary aminoiodoilanes may have the formula $SiI_2(NHR^1)_2$, wherein $R^1$ is selected from $C_1$-$C_{10}$ alkyl, aryl, or hetero group. In some embodiments $R^1$ may be methyl, ethyl, n-propyl, iso-propyl, n-butyl, iso-butyl, sec-butyl, or tert-butyl. An exemplary compound includes $SiI_2[NHCH(CH_3)_2]_2$.

Exemplary aminoiodoilanes may have the formula $SiI(NHR^1)_3$, wherein $R^1$ is selected from $C_1$-$C_{10}$ alkyl, aryl, or hetero group. In some embodiments $R^1$ may be methyl, ethyl, n-propyl, iso-propyl, n-butyl, iso-butyl, sec-butyl, tert-butyl, cyclopentyl, or cyclohexyl.

EXAMPLES

The following are non-limiting examples that are provided to further illustrate embodiments of the invention. However, the examples are not intended to be all inclusive and are not intended to limit the scope of the inventions described in this disclosure.

Example 1: Synthesis of bis(t-butylamino(diiodo)silane—$SiI_2(NH-t-Butyl)_2$

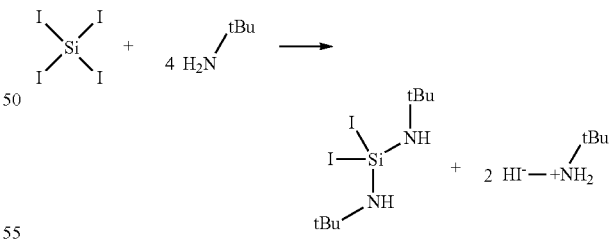

A 250 mL three neck round bottom flask equipped with a mechanical stirrer, a thermocouple, and a rubber septum was charged with a solution of tetraiodosilane (10 g) in toluene (50 mL). The solution was cooled using a brine bath. A solution of t-butylamine (5.4 g) in hexane (40 mL) was added dropwise to the chilled solution at less that about −2° C. using a disposable syringe and a syringe pump. An immediate reaction took place, resulting in formation of a white precipitate, but no large exotherm was observed. The reaction temperature was maintained at less than about −2° C. without adjusting the addition rate of the amine solution.

The reaction mixture was allowed to stir overnight as it warmed to ambient temperature.

The reaction mixture was then filtered through a coarse polyethylene (PE) filter into a clean flask. The resulting clear yellow solution was stripped of all volatiles under reduced pressure (50 mTorr).

The crude product was distilled under a 50 mTorr vacuum in a 125° C. oil bath. The appearance of the resulting purified product, bis(t-butylamido)diiodosilane, was a slightly yellow oil. The product was 97% pure and contained about 2.5% of a minor impurity that was not separated in the short path distillation.

FIG. 1 is an illustration of a proton NMR spectrum of bis(t-butylamino(diiodo)-silane produced by this example.

Figure 2:
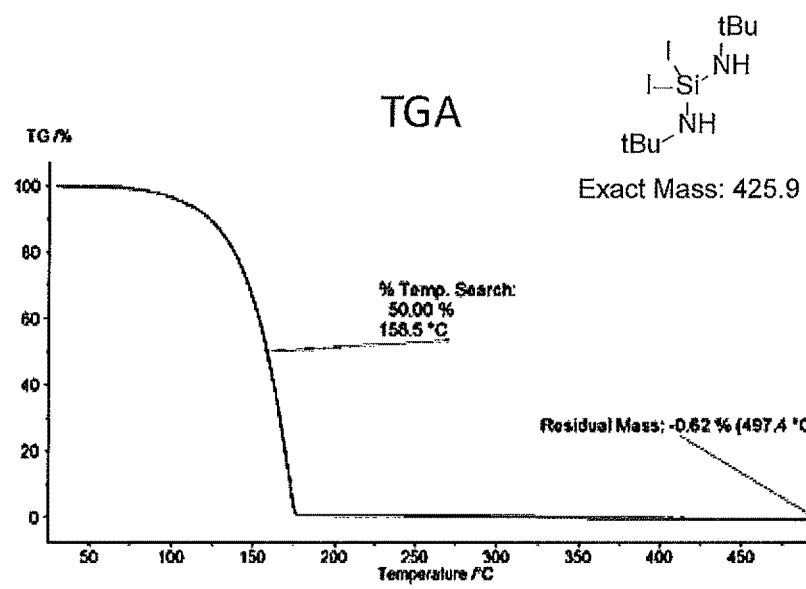
FIG. 2 are illustrations of a thermogravimetric analysis plot (TGA plot) and mass spectrum of bis(t-butylamino (diiodo)silane produced by a method described in this disclosure.
Figure 2:
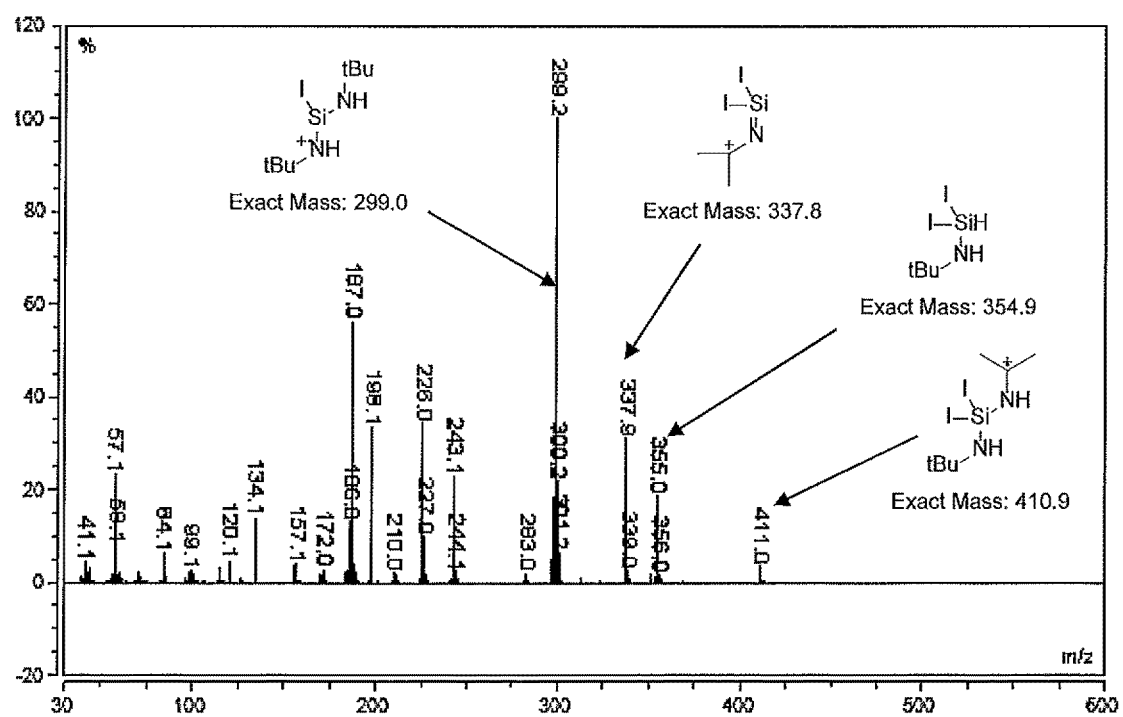

FIG. 2 are illustrations of a thermogravimetric analysis (TGA) plot and mass spectrum of bis(t-butylamino(diiodo) silane produced by this example.

Example 2: Synthesis of t-butylamino(triodo)silane—SiI$_3$(NH-t-Butyl)

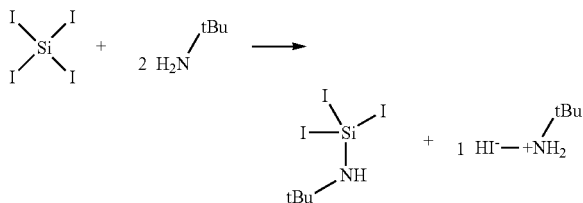

A 100 mL flask was charged with tetraiodosilane (10 g) and toluene (40 mL) and capped with a septum. A separate flask was charged with 2-methylpropan-2-amine (2.7 g) and hexane (40 mL) and capped with a septum. The reactor was charged with the tetraiodosilane solution via cannula transfer, and a cooling circulator at about −5° C. was used. The amine solution was then added in a dropwise fashion using a syringe and a syringe pump with the reaction temperature staying at less than about 0° C. The reaction mixture was then allowed to warm to ambient temperature.

The reaction mixture was sampled by proton NMR, which showed one resonance consistent with a t-butyl group. The reaction mixture was then filtered over to a round bottom flask via a coarse PE filter stick. The solvent was removed from the slightly pink solution to yield a pale yellow oil with some solid precipitated. Upon transfer of this semi-solid, the entire mass solidified. Proton NMR showed that the crude product was roughly 96% pure. The crude product was then distilled in a short path distillation apparatus under full vacuum to give a near colorless oil. Upon scraping the side of the distillation receiving flask, the residue quickly solidified to a white solid.

Figure 3:
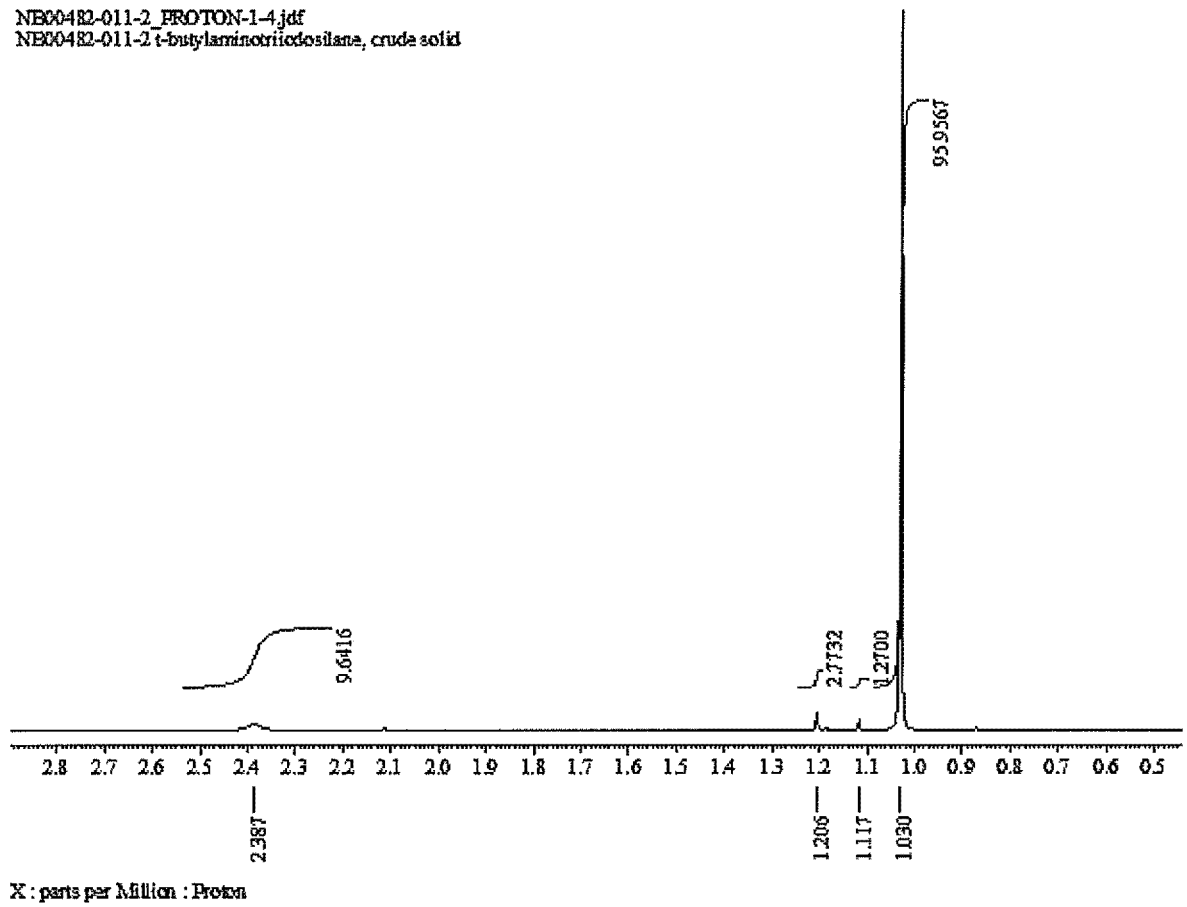
FIG. 3 is an illustration of a proton NMR spectrum of t-butylamino(triodo)silane produced by a method described in this disclosure.

The distilled, solidified product was assayed by proton, carbon, and silicon NMR. FIG. 3 is an illustration of a proton NMR spectrum of t-butylamino(triodo)silane produced by this example.

Additional changes in the details, materials, steps, and arrangement of parts, described and illustrated in order to explain the nature of the invention, may be made by those skilled in the art within the principle and scope of the invention as expressed in the appended claims. The present disclosure is not intended to be limited to the specific embodiments in the examples provided above.

What is claimed is:

1. A method of synthesizing an aminoiodosilane comprising:

contacting an iodosilane having the formula SiI$_4$ with an monosubstituted amine having the formula NH$_2$R$^1$ to produce an aminoiodosilane reaction product having the formula SiI$_y$(NHR$^1$)$_z$, wherein R$^1$ is selected from a C$_1$-C$_{10}$ alkyl or cycloalkyl, aryl, or a hetero group; y=1 to 3; and z=4−y.

2. The method of claim 1, wherein a molar ratio of the iodosilane to the monosubstituted amine ranges from approximately 1:2 to 1:4.

3. The method of claim 1, further comprising isolating the aminoiodosilane reaction product from a crude mixture produced by the reaction.

4. The method of claim 1, further comprising vacuum distilling the aminoiodosilane reaction product.

5. The method of claim 1, wherein the method produces an aminoiodosilane reaction product and an alkylammonium iodide salt.

6. The method of claim 1, wherein the reaction is performed in a solvent.

7. The method of claim 6, wherein the solvent is toluene.

8. The method of claim 1, wherein the monosubstituted amine is t-butylamine and the aminoiodosilane is t-butylaminotriiodosilane.

9. The method of claim 1, wherein the monosubstituted amine is methylamine or ethylamine and the aminoiodosilane is methylaminotriiodosilane or ethylaminotriiodosilane.

10. The method of claim 1, wherein the monosubstituted amine is isopropylamine and the aminoiodosilane is isopropylaminotriiodosilane.

11. The method of claim 1, wherein the aminoiodosilane is bis(t-butylamino)diiodosilane or bis(isopropylamino)diiodosilane.

12. The method of claim 1, wherein the amine is added to the iodosilane.

* * * * *